United States Patent

Maruo

[19]

[11] Patent Number: 5,982,919
[45] Date of Patent: Nov. 9, 1999

[54] IMAGE PROCESSOR HAVING OBJECT RECOGNITION ABILITY

[75] Inventor: Kazuyuki Maruo, Sendai, Japan

[73] Assignee: Advantest Corp., Tokyo, Japan

[21] Appl. No.: 08/666,535

[22] PCT Filed: Jan. 19, 1996

[86] PCT No.: PCT/JP96/00078

§ 371 Date: Oct. 16, 1996

§ 102(e) Date: Oct. 16, 1996

[87] PCT Pub. No.: WO96/23278

PCT Pub. Date: Aug. 1, 1996

[51] Int. Cl.$^6$ ............................................. G06K 9/00
[52] U.S. Cl. ............................................. 382/141; 382/288
[58] Field of Search ............................. 345/418; 348/125, 348/129; 358/453, 462; 364/468.01, 468.02; 382/141–152, 173, 175, 180, 203, 206, 209, 256, 288, 291, 286–289, 100; 73/65.01; 446/273

[56] References Cited

U.S. PATENT DOCUMENTS 4,484,081  11/1984  Cornyn, Jr. et al. ............... 250/559.46
5,301,248   4/1994  Takanori et al. .................... 382/147

Primary Examiner—Jon Chang
Assistant Examiner—Jayanti K. Patel
Attorney, Agent, or Firm—Muramatsu & Associates

[57] ABSTRACT

An image processor is able to recognize one object as a mass as if viewed by human eyes even though the object appears to be separated in two pieces. The image processor performs steps to input digital image information and store it in the memory, to process each pixel having density information with threshold value so as to convert them into binary images such as active and non-active images, to provide the same label number for a group of active images which are adjacent each other, to make a list and calculate center of gravity for each label and a distance between the center of gravity and a furthest point of each label and an angle relative to a line connecting the center of gravity and furthest point, to detect the existence of active images which belong to another label within a certain range extending from the line, and to output the list as a pair label information if other active images of another label are found.

5 Claims, 3 Drawing Sheets

IMAGE PROCESSOR HAVING OBJECT RECOGNITION ABILITY

FIELD OF THE INVENTION

This invention relates to an image processor having object recognition ability which is used for a LCD (liquid crystal display) tester for inspecting objects by using images, image inspection apparatus such as a CCD (charge-coupled device) tester, or image recognition apparatus for recognizing objects by using images.

BACKGROUND OF THE INVENTION

Conventionally, there have been many types of image processing apparatus for inspecting, recognizing, determining, or analyzing objects with use of images. Generally, most of them perform the image processing by using a computer which processes an image as a digitized image. Among the conventional types, there is also an apparatus which displays an image in two-tone such as black and white, or red and blue, by converting density of pixels into a binary system, as 0 and 1. The present invention relates to an image processor having object recognition ability which deals with the images which are processed by binary system, i.e., binary images. In this case, a pixel is defined as one of the points which compose a screen, i.e., an element, and an image is defined as a pixel having density value. In the binary image system, an image displayed as 1 or in black is called an active image. On the other hand, an image which is displayed as 0 or in white is called a non-active image.

Conventionally, a labeling system has been utilized so that the image processing apparatus is able to recognize an object which appears to be a mass of object to human eyes. In the conventional labeling system, it is arranged that the active image objects, which are adjacent each other and considered to be a mass, are labeled as "A, B, C . . .". The objects labeled in the same letter, for example as "A", are recognized to be in the same group.

However, the conventional labeling system is associated with the following disadvantage. Even though it is appeared to be a mass to human eyes, if there is one missing pixel in the object, the apparatus recognizes the object as the two separate objects. For example, as in FIG. 4, if there is a gap 55 between each pixel in the right and left sides of a golf club as a result of an interruption by noise or the like, the image processing apparatus recognizes the golf club as the two separate objects, a club head 51 and shaft 50. The image processing apparatus may recognize the left object as a hammer, the right object as a bar. Thus, it has been very difficult for the conventional image processing apparatus to recognize an object with gaps as a whole, even though it is appeared to be the golf club to human eyes, i.e., one continuous object.

SUMMARY OF THE INVENTION

Therefore, it is an object of the present invention to provide the image processor having an ability to recognize an object which is digitized in the binary system as a mass, as if it is appeared to be a mass to human eyes. Namely, the present invention is able to recognize one object as a whole even if it is divided to multiple labels, as if viewed in the human eyes.

In the image processing apparatus of the present invention, an object is labeled at first. Then, the object divided in the multiple labels is analyzed whether or not it is one object by a particular means/method so that the image processing apparatus is able to recognize the object in the same level of recognition ability as the human eyes.

The above method of the present invention is discussed in the following.

Digital image data is input by an image input device and stored in an input image memory by means of CCD camera or other communication means. If necessary, this digital image data is noise-removed by means of an average filter method or median filter method. Then, the density of each pixel is coded in the binary numbers by a threshold value. For example, if the density of the pixel is displayed in a range of 0–100, the threshold value is arranged to be a half of it, as 50. If the density of a pixel is either equal or more than 50, it is regarded to be a number 1, an active image, and displayed in black. If the density of a pixel is less than 50, it is regarded to be a number 0, a non-active image, and displayed in white. Namely, the density of the pixels is coded in the binary numbers, either 0 or 1.

Then, the labeling is performed for each active image having the number 1 to produce a map of the labeled active images. In this case, the labeled active images have specific label number information. On the other hand, the non-labeled non-active images do not have label number information. For the image data having the binary number, a list (table) is made per each label number. Next, an entire image space is scanned to check whether each pixel has any label number information. If the pixel has the label number information, its coordinate information is registered in the list of the above label name. After the above process is completed for the entire images, a list of each label and coordinate information of all active images which belong to each label is produced. As a result, each mass of the objects is obtained. Next step is to determine whether these objects are independent or connected to another object.

First, the center of gravity of the label is obtained based on the coordinate information of the active coordinate. In this case, the center of gravity means an average value of the X-Y coordinate of all active images that belong to said label.

Second, the distance between each image that belongs to said label and center of gravity of said label is calculated. The furthest image point is determined by detecting an active image having the maximum distance in said label. Then, a distance and angle of a straight line extending from the center of gravity to the furthest image point is measured, whereby a coordinate distance and declining angle are obtained.

Third, the existence of active images that belong to another label is examined by using the coordinate distance and its angle. There are different ways to examine the existence of the active images depending on the shapes of the objects. One way is to examine in a semi-circular range within the predetermined degree from the furthest image. The other way is to examine in a certain circular range. In this case, a semi-circular range is employed. The semi-circular range is defined on a straight line, which is less than five times, in this case, three times of a distance extending from the center of gravity to the furthest point, with an angle of +/−5°, in this case, +/−3°, from that straight line. If an active image which belongs to a different label from said label is found within this range, it is considered that the discovered label forms a pair with said label. Then, these two label numbers are registered as the pair information. This process is performed for all labels. If the same pair is found in the opposite label, it is not necessary to resister it as the pair information, allowing to avoid duplicated information. Since the pair information is output from an output device, a person is able to identify the pair labels in a list.

Furthermore, images of the pair labels can be connected on a screen. There are several methods to connect the images of the pair of labels. One method is to connect each of the furthest point images of each label, i.e., an active image located in the furthest end of each label. The other method is to connect the active images which are located in the closest point of each label. The preferred embodiment of the present invention employs a method to connect each other's center of gravity.

For this pair of labels having the above pair information, a line is drawn from the center of gravity of one label to the center of gravity of another label. A carrier having the same coordinate information as the center of gravity of one label is hereby provided. In this case, the carrier means the pixels composing a basic single line that connects both center of gravity. This carrier is moved per one pixel unit from the center of gravity of one label to the center of gravity of another label. As the carrier is moved, the coordinate and value of nearby pixels of the carrier are numbered as 1, the active image. Namely, if the pixel value is 1, it is remained to 1. If a pixel value is 0, it is changed to 1. The nearby pixels exist within a predetermined width which is referred by the width of one label, which is also the width of the broad line. The above process is continued until the carrier reaches the coordinate of another center of gravity. Then, the images of the pair of labels are connected by the broad line.

The carrier can also be made by immediately converting the pixels to the active pixels, which are located between both center of gravity on a straight line. Then, it is possible to draw a broad line having a certain width near the carrier. After the above process is done, the images are stored in an output image memory and output in a display device by means of an image output device. As a result, the pair of labels are visibly connected and displayed in a screen.

PREFERRED EMBODIMENT OF THE PRESENT INVENTION

Figure 1:
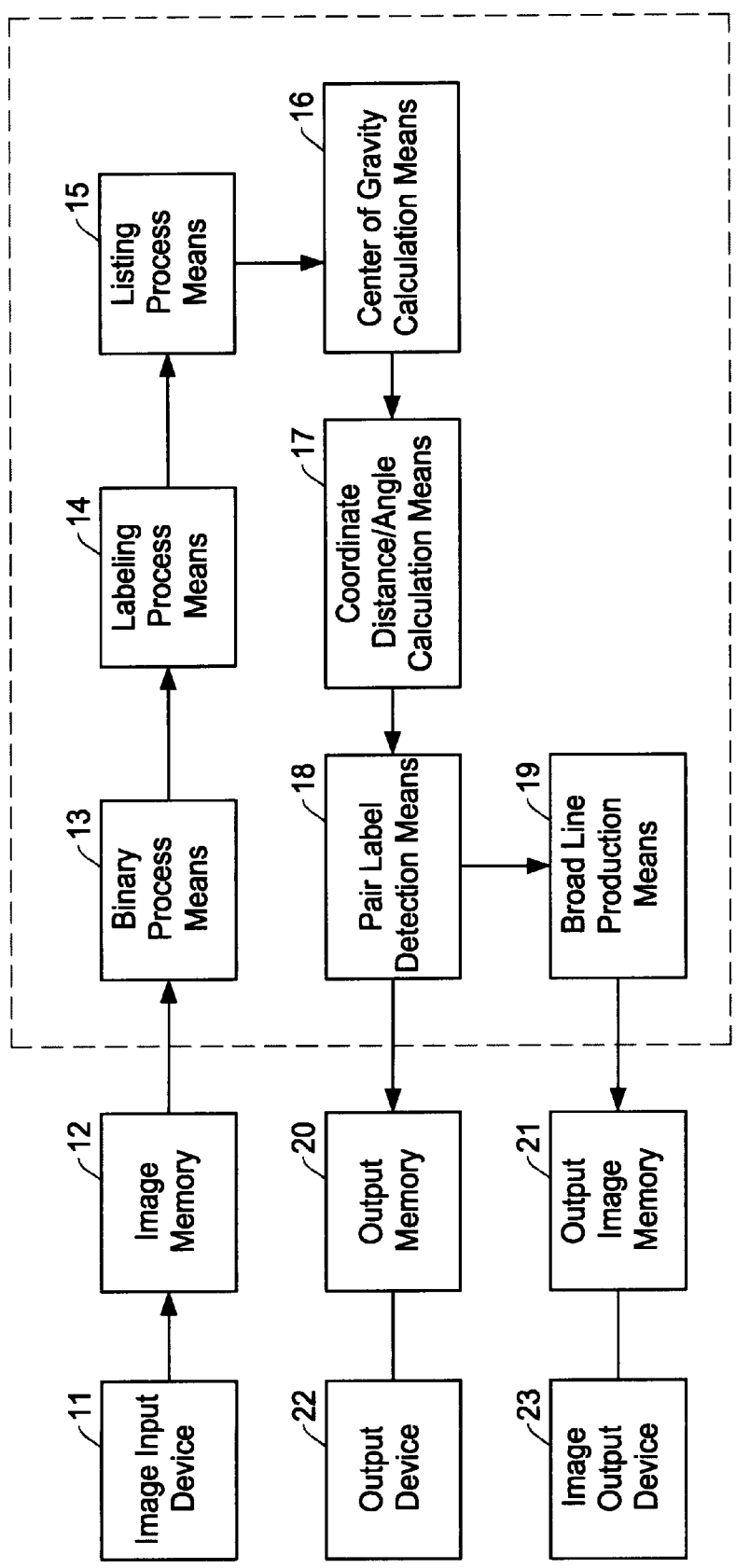
FIG. 1 is a block diagram showing one preferred embodiment of the present invention.

FIG. 1 is a block diagram showing one preferred embodiment of the present invention. The present invention is discussed in the following in reference to FIG. 1.

First, two-dimensional digital image data is input from an image input device 11 and stored in an input image memory 12. Each pixel of this digital image data has multiple degrees, for instance, 0–100 degrees of density value. If the image data contains noise element, a noise elimination process such as a median filter process (not shown in the drawing) is performed, if necessary.

Then, the labeling process is performed in these binary images. However, if the labeling is performed without taking any necessary steps, it may include isolated points such as noise. It will result in a complicated procedure and errors. Thus, in order to solve the above problem, the following procedure is provided. First, the labeling is temporarily performed. Next, if an area of each label, i.e., a number of active images, is very small, such as 5 or less, a threshold procedure is taken place so as to erase labels of which threshold value is smaller than predetermined threshold value. Finally, the re-labeled binary images are produced. The above procedure is performed in a labeling process means 14.

By utilizing these labeled active images, a listing process means 15 produces a list containing each label number. Then, it checks whether or not each pixel has any label number information by scanning entire image space of the screen. If a pixel is determined that it has the label number information, the coordinate information of that active image is registered in the list having the label number. The listing process means 15 performs the above-described procedure for all pixels so as to produce a list of the labels and the coordinate information of all active images which belong to those labels.

Next, the center of gravity $O_{x,y}$ of the label is obtained a center of gravity calculation means 16 based on the coordinate information in the above list. The center of gravity $O_{x,y}$ means an average calculated value of the X-Y coordinate of all active images which belong to said label. The center of gravity $O_x$ and $O_y$ are expressed in the formulae as follows:

$$O_x = \Sigma A_x / n$$

$$O_y = \Sigma A_y / n$$

In this case, "n" represents a number of all active images which belong to said label. $\Sigma A_x$ and $\Sigma A_y$ represent the sum value of each X-axis and Y-axis of all active images "n" which belong to said label. It is also possible to display in a vector departing from the original point of the X-Y coordinate.

Next, in each label, the distance between the center of gravity $O_{x,y}$ and each active image which belongs to the label is calculated. An active image having a maximum distance is defined as $P_{x,y}$. Then, a coordinate distance d of a straight line between the center of gravity $O_{x,y}$ and furthest point $P_{x,y}$, and its angle θ at the center of gravity are calculated. This calculation process is performed in a coordinate distance/angle calculation means 17.

Once the coordinate distance d and angle θ of each label are calculated, based on these values, the existence of another label which is to be paired with said label is detected by a pair label detection means 18. One example is explained in the following in reference to FIGS. 2 and 3.

Figure 2:
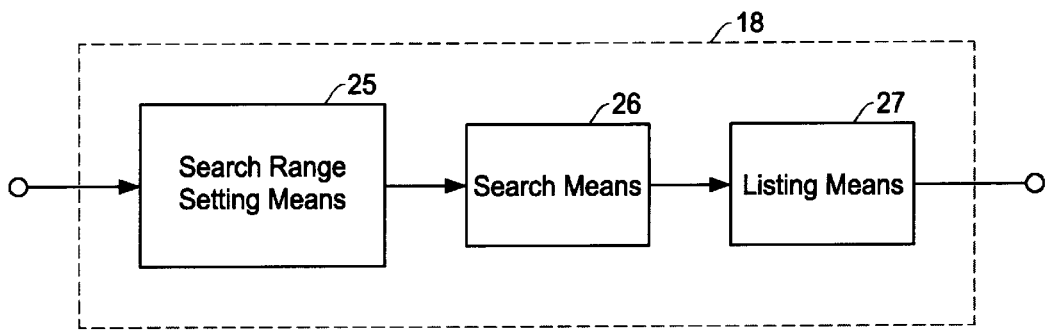
FIG. 2 is a detailed block diagram showing the part of the present invention.

FIG. 2 shows one method used in the pair label detection means 18. First, a search range is determined by a search range setting means 25 with use of the center of gravity and furthest point. One method is to check the existence of the active images of another label within a circular range, defined by a radius r which is referred by the coordinate distance d around the furthest point P.

Figure 3:
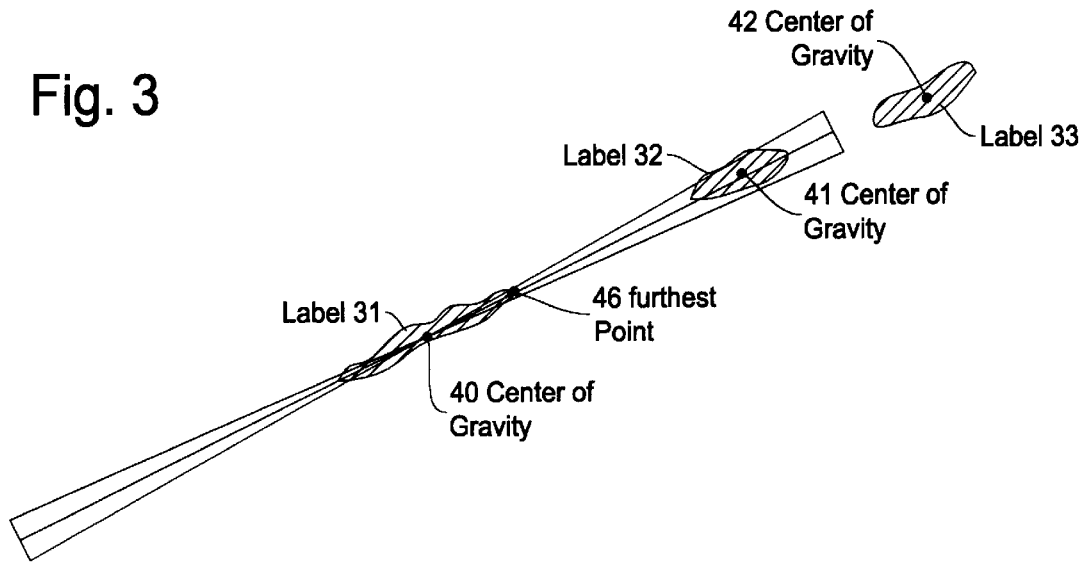
FIG. 3 explains the operation of the present invention.
Figure 4:
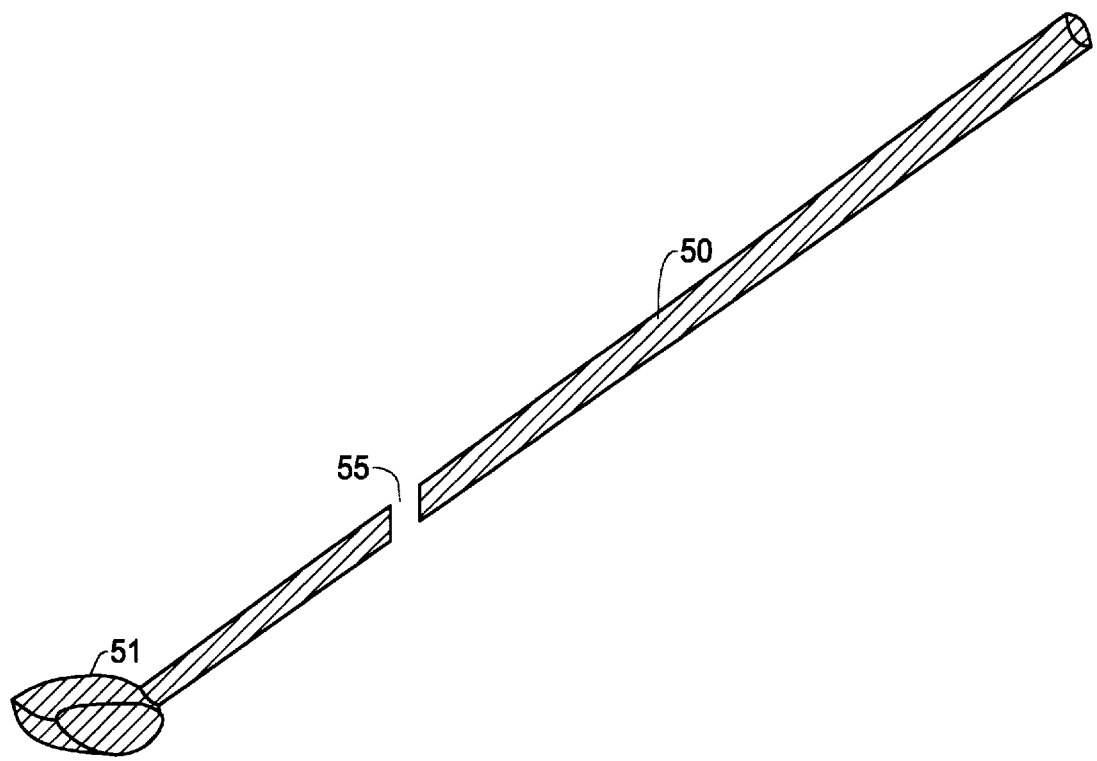
FIG. 4 explains the image recognition system of the prior art.

However, we employ more secure method in this preferred embodiment, which is discussed in FIG. 3. The length (distance) of the search range is defined to be three times of the coordinate distance d disposed between the center of gravity 40 and furthest point 46 of a label 31. Then, two lines with +/−3° angles relative to the declining angle θ are drawn. Within these two lines, i.e., the inside of the semi-circular range is defined as the search range. It is considered that if another label connected to this label is ever found, it should be located in the direction of this longitudinal shaft.

Once the search range is determined, a search means 26 starts searching the existence of another label. In FIG. 3, if a new label 32 is found, a listing means 27 registers the labels 31 and 32 as a pair of information to be connected, as labels "A" and "B", in the binary image list which has been previously produced. This procedures is performed for all labels. The searching process taken place in the "B" label 32 detects the existence of the "A" and "C" labels, 31 and 33. Both labels 31 and 33 could be registered as the paired information of the label 32. However, since the label 31 has been already registered as the pair information of the label 32, it should be eliminated from the listing in order to avoid the duplication. Then, the list adding these pair information is stored in an output memory 20 and displayed or printed out by an output device 22, whereby information such as the pair of the labels to be connected with each individual label can be visibly seen.

A broad line production means 19 is utilized to connect each pair label on the screen. One method to connect both labels is to connect both active images which are located in the closest ends to each label. However, this method is disadvantageous because it takes too long time to search and determine which pair of the active images are the closest to each other. Thus, it is better to connect the center of gravity of each label. It is arranged that all carrier pixels located on a line between both center of gravity are active images with the pixel value 1. In this case, the connection with only one pixel is too thin. Thus, a certain number of multiple pixels are connected each other so that it forms a broad line with a certain width.

The width of the broad line should be same as the narrowest part of the original pair labels. Thus, at first, the width of the narrowest part of the original pair labels is obtained. Then, the pixels located in both left/right sides of the carrier pixels on the line between both center of gravity are arranged to be active images within the above predetermined width of the broad line. Finally, all of the above-processed images in one screen are stored in an output image memory 21 and output from an image output device 23 to the display and transmission devices.

Although each procedure and calculation are performed individually in the foregoing, it is also possible to perform with a computer 24. Namely, the binary process means 13, labeling process means 14, listing process means 15, center of gravity calculation means 16, coordinate distance/angle calculation means 17 and pair label detection means 18 are all structured in the computer 24. Moreover, the broad line production means 19 can be structured in the computer 24.

As has been precisely discussed in the foregoing, the image recognition system of the present invention for inspecting and determining the images enables to recognize an object as a mass, as if viewed in the human eyes, even though there is a gap in the middle. In other words, if the active images of one object are separated, the conventional image apparatus recognizes it as the multiple objects. However, the present invention enable to recognize it as one object as seen in the human eyes. Therefore, the present invention can solve the problem of the erroneous inspection and determination, and its effect is greatly appreciated.

What is claimed is:

1. An image processor having object recognition ability for inspecting, recognizing and determining an object with use of images, comprising:

an input image memory (12) for storing input digital image information;

a binary process means (13) for processing density data of each pixel in said input image memory (12) with threshold value so as to convert the density data to binary image comprised of active images and non-active images;

a labeling process means (14) for providing the same label to a group of active images which is adjacent said binary image;

a listing process means (15) for producing a list per each label and coordinate information of all active images which belong to said label;

a center of gravity calculation means (16) for obtaining the center of gravity $O_{x,y}$ of each label by averaging individual coordinate in the group of the active image of each label;

a coordinate distance/angle calculation means (17) for calculating a coordinate distance d of a straight line which is disposed between the center of gravity $O_{x,y}$ and the furthest point $P_{x,y}$ of the label and an angle $\theta$ at the center of gravity $O_{x,y}$ relative to the straight line;

a pair label detection means (18) for detecting whether or not another adjacent label forms a pair with said label by checkinq whether or not there is an active image group which belongs to another label within a predetermined semi-circular range which is defined by a distance less than five times of said coordinate distance d and by said angle $\theta$ which is less than $+/-5°$; and an output memory (20) for storing label numbers which are determined to be paired.

2. An image processor having object recognition ability which inspects, recognizes and determines an object by using images, comprising:

an input image memory (12) for storing input digital image information;

a binary process means (13) for processing density data of each pixel in said input image memory (12) with threshold value so as to convert the density data to binary image comprised of active images or non-active images;

a labeling process means (14) for providing the same label to a group of active images which is adjacent said binary image;

a listing process means (15) for producing a list per each label and coordinate information of all active images which belong to said label;

a center of gravity calculation means (16) for obtaining the center of gravity $O_{x,y}$ of each label by averaging individual coordinate in the group of the active image of each label;

a coordinate distance/angle calculation means (17) for calculating a coordinate distance d of a straight line which is disposed between the center of gravity $O_{x,y}$ and the furthest point $P_{x,y}$ of the label and an angle $\theta$ at the center of gravity $O_{x,y}$ relative to the straight line;

a pair label detection means (18) for detecting whether or not another adjacent label forms a pair with said label by checking whether or not there is an active image group which belongs to another label within a predetermined semi-circular range which is defined by a distance less than five times of said coordinate distance d and by said angle $\theta$ which is less than $+/-5°$; and a broad line production means (19) for drawing a broad line by converting an area adjacent said straight line disposed between each center of gravity of each label to active images; and an output image memory (21) for storing all images forming said broad line.

3. An image processor having object recognition ability of claim 2, it is characterized in that said broad line production means (19) forms a broad line containing carriers and their nearby pixels which are converted into active images, wherein said pixels are located along the line connecting each center of gravity of said paired labels.

4. An image processor having object recognition ability of claim 2, it is characterized in that said broad line production means (19) forms a broad line containing carriers and their nearby pixels which are converted into active images, wherein said pixels forms a line connecting each end of said paired labels in the shortest distance.

5. An image processor having object recognition ability of claims 1, 3 or 4, it is characterized in that said binary process means (13), labeling process means (14), listing process means (15), center of gravity calculation means (16), coordinate distance/angle calculation means (17) and pair label detection means (18) are structured in a computer (24).

* * * * *